US005337999A

United States Patent [19]

Kelley

[11] Patent Number: 5,337,999

[45] Date of Patent: Aug. 16, 1994

[54] SECURITY RETAINING MEMBER

[75] Inventor: Donald W. Kelley, Fremont, Calif.

[73] Assignee: Qualtec Data Products, Inc., Fremont, Calif.

[21] Appl. No.: 985,009

[22] Filed: Dec. 2, 1992

[51] Int. Cl.[5] ............................................ F16M 13/00

[52] U.S. Cl. ................................ 248/551; 248/205.3; 411/258

[58] Field of Search ............ 248/551, 552, 553, 205.3; 70/58; 411/258, 452, 454

[56] References Cited

U.S. PATENT DOCUMENTS

| | | | |
|---|---|---|---|
| 4,300,371 | 11/1981 | Herwick et al. | 248/553 X |
| 4,603,829 | 8/1986 | Koike et al. | 248/553 |
| 4,712,763 | 12/1987 | Leite | 248/553 |
| 4,733,840 | 3/1988 | D'Amore | 248/551 X |
| 4,739,637 | 4/1988 | Finkel et al. | 248/551 |
| 4,744,187 | 5/1988 | Tripp | 411/542 X |
| 4,778,702 | 10/1988 | Hutter, III | 248/205.3 X |
| 4,799,845 | 1/1989 | Hrysko | 411/542 |
| 4,830,558 | 5/1989 | Sweeney | 411/258 |
| 5,069,589 | 12/1991 | Lemke | 411/258 X |
| 5,076,079 | 12/1991 | Monoson et al. | 70/58 |
| 5,135,197 | 8/1992 | Kelley et al. | 70/58 |
| 5,184,798 | 2/1993 | Wilson | 248/551 |
| 5,209,445 | 5/1993 | Bergetz | 248/551 |

*Primary Examiner*—Ramon O. Ramirez
*Attorney, Agent, or Firm*—Fliesler, Dubb, Meyer & Lovejoy

[57] ABSTRACT

A security retaining member with a core having a central portion and a plurality of petal-like portions extending outwardly from the central portion and a material in which the core is embedded. Each of the petal-like portions comprises a hole through which the material in which the core is embedded is permitted to flow during the fabrication of the member for enhancing the adherence of the material to the core. The material typically comprises 60 durometer neoprene.

15 Claims, 1 Drawing Sheet

SECURITY RETAINING MEMBER

BACKGROUND OF THE INVENTION

1. Field of the Invention

The present invention relates to security apparatus in general and in particular to a security retaining member which is used in conjunction with an adhesive for retaining equipment and/or parts in a security apparatus.

2. Description of the Related Art

To prevent theft or unauthorized removal of equipment, security apparatus using cables and/or various types of key-operated housings in conjunction with brackets, bolts, adhesive pads, rubberized retaining members with an adhesive and the like, is used for mounting or otherwise attaching equipment to an underlying surface. For example, in applicant's U.S. Pat. No. 5,135,197, entitled Equipment Security Method and Apparatus, assigned to the assignee of the present application, there is provided a base member and a cover member. The base member is attached to a vertical or horizontal surface by means of bolts or adhesive pads, plates and/or brackets as required in a particular installation. The cover member is removably attached to the base member by means of a key operated lock. The equipment to be secured is attached to the cover member by means of U-shaped rod members, bracket members with inwardly directed fingers for engaging holes in the sides of the equipment or the like.

In U.S. Pat. No. 4,739,637 entitled Locking Device for Portable Equipment, bolts are disclosed for use in mounting a typewriter or the like in a secure fashion to an underlying housing in a security apparatus.

In U.S. Pat. No. 4,712,763 entitled Security Device for Office Machines, foot members comprising rubber-like disks are disclosed for use in conjunction with an adhesive for mounting the disks to the undersurface of an office machine or the like for subsequent attachment to a housing in an underlying security device.

In applicant's U.S. patent application Ser. No. 07/844,795 entitled Equipment Security Apparatus, assigned to the assignee of the present application, retaining foot members comprising synthetic rubber coated perforated metallic washer-like members are disclosed for use in conjunction with an adhesive for mounting a computer or the like to a housing in an underlying security apparatus.

In still other prior known security systems, equipment is secured to a structure using an assembly of adhesive retaining members, such as those which use closed-cell foam pads, cables, padlocks and the like.

Rubber-like retaining and other types of adhesive members which have been used heretofore in security apparatus, such as described above, have typically comprised relatively large area closed-cell adhesive pads, solid rubber or synthetic rubber disks, rubber or synthetic rubber coated metallic disks, as well as rubber or synthetic rubber coated perforated metallic disks wherein the holes are provided for improving the adherence of the rubber or synthetic rubber coating to the disk, such as disclosed in applicant's above-identified U.S. patent application Ser. No. 07/844,795.

It has been found that among the disadvantages of the prior known adhesive pads is the disadvantage that they can be easily cut using a garrote and that they typically require a large contact area in order to provide sufficient holding force.

Among the disadvantages of the prior known rubber-like disks is the disadvantage that, while they provide a substantial holding force for a relatively smaller contact area, e.g. 2 inches in diameter, the bond formed using customary adhesives for bonding the disks to a surface fail and/or the disk material is ruptured or torn apart when subjected to a relatively low magnitude of tensile force. For example, the adhesive bond using customary adhesives for even the strongest of the prior known rubber-like retaining members of the type which comprise a rubber-like coated metallic disk having holes for improving the adherence of the rubber-like material to the disk and having a diameter of approximately 2 inches has been found to fail and allow separation of the disk from a surface to which it is adhesively attached and/or for the rubber-like material to separate from the metallic disk under a relatively small tensile force of from 200 pounds to 400 pounds.

SUMMARY OF THE INVENTION

In view of the foregoing, a principal object of the present invention is an improved retaining member for use in conjunction with an adhesive which provides a substantial increase in holding force with no increase in contact area for mounting or attaching equipment and parts in a security apparatus.

In accordance with the above-described principal object of the present invention there is provided a rubber-like retaining member comprising a relatively thin metallic core. In a preferred embodiment of the invention the metallic core has a shape comprising four radially extending petals, each of the petals comprising a hole into and through which a rubber-like coating material, such as neoprene, is allowed to flow during the fabrication of the retaining member. A threaded bore, threaded insert or other fitting may be provided in the center of the metallic core for attaching mating fittings or the like to the member or for attaching the member to a housing.

Tests of the strength of the bond using conventional adhesives used heretofore to bond prior known rubberized disk retaining members and the tensile strength of the rubber-like coating on a typical 2 inch diameter retaining member according to the present invention indicate that the application of a tensile force of more than 800 pounds, and in some specimens more than 1000 pounds, is required to cause a destruction of the adhesive bond and/or a separation of the rubber-like coating from the metal core or other failure of the retaining member.

BRIEF DESCRIPTION OF THE DRAWINGS

The above and other objects, features and advantages of the present invention will become apparent from the following detailed description of the accompanying drawings, in which.

DESCRIPTION OF THE PREFERRED EMBODIMENTS

Referring to FIGS. 1-4, there is provided in accordance with the present invention a security retaining member designated generally as 1 comprising a metallic core 2, as of diecast zinc, embedded in a rubber-like material 3, such as 60 durometer neoprene, which may be black in color.

Figure 1:
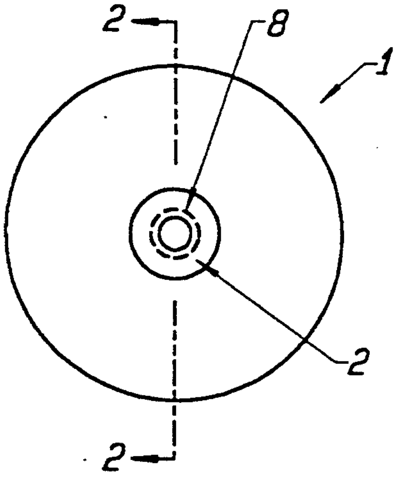
FIG. 1 is a plan view of a security retaining member in accordance with the present invention.
Figure 2:
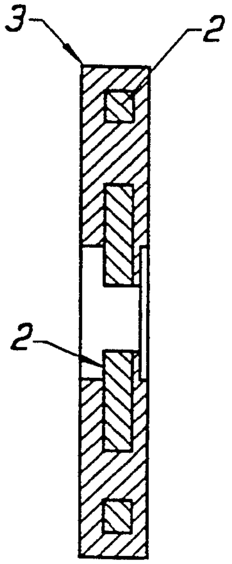
FIG. 2 is a cross-sectional view taken in the direction of lines 2—2 of FIG. 1.
Figure 3:
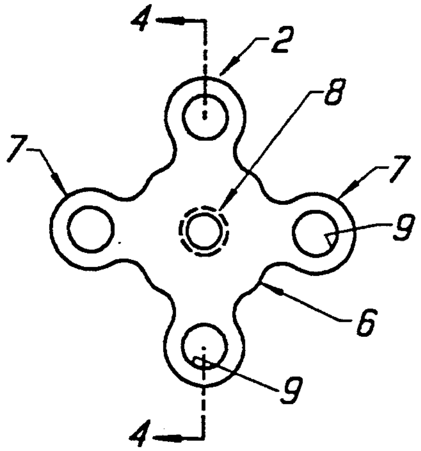
FIG. 3 is a plan view of the core of the retaining member of FIGS. 1 and 2.
Figure 4:
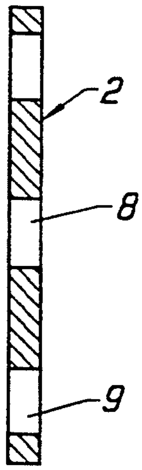
FIG. 4 is a cross-sectional view taken in the direction of lines 4—4 of FIG. 3.

The core 2 comprises a central portion 6 and a plurality of four petal-like portions 7 which extend outwardly from the central portion 6, having a centerline 90 degrees apart as shown most clearly in FIG. 3. In the center of the central portion 6 there is provided a threaded bore or threaded insert 8 having a diameter of approximately 0.25 inches for receiving a suitable fitting or screw for releasably attaching the retaining member to other security apparatus, e.g. housing, cable, or the like. In each of the petal-like portions 7 there is provided a hole 9 having a diameter of approximately 0.25 inches. The centers of the holes 9 in the four petal-like portions 7 lie on a circle having a diameter of approximately 1.25 inches. The overall diameter of the member 1 including the flexible material 3 is approximately 1.90 inches.

In fabricating the member 1, after forming the core 2, the core 2 is embedded in the neoprene material 3 in such a manner that the neoprene material flows through the holes 9 so as to improve and enhance the adherence of the material 3 to the core 2.

In use, the retaining member is attached to a surface, such as the base or under surface of a computer, by means of a high tensile force adhesive, such as for example, Super Bonder made by Loctite, Newington, Conn.

In comparison with prior known rubber-like retaining/foot members of comparable contact area which lave been used for mounting equipment or attaching parts in security apparatus, it is found that the amount of tensile force required to break the adhesive bond between the retaining member 1 and the surface to which it is adhesively attached using adhesives used heretofore for bonding prior known rubberized retaining members and/or to rupture the neoprene material or separate the neoprene material from the core 2 in the retaining member 1 is from three to four times greater than that required to break the bond and/or to rupture or separate the neoprene material from the core in prior known rubber-like foot members. This increased performance and holding force is attributed to the space between the plurality of petal-like portions which allows the neoprene in the member 1 to stretch and conform much more closely to the shape/contour of the surface to which it is adhesively attached.

While a preferred embodiment of the present invention is described above, it is contemplated that numerous modifications may be made thereto for particular applications without departing from the spirit and scope of the present invention. For example, the core 2, which in the preferred embodiment comprises a precast zinc, may be replaced by other suitable metallic or plastic material. Similarly, the neoprene 3 may be replaced by other suitable flexible material which can be made to adhere to another surface by means of an appropriate adhesive such as the above-described Super Bonder made by Loctite, Newington, Conn. Of course, the contact area of the member can be increased for even greater holding force. Accordingly, it is intended that the embodiments described be considered only as illustrative of the present invention and that the scope thereof should not be limited thereto but be determined by reference to the claims hereinafter provided.

What is claimed is:

1. A security retaining member comprising:

a core having a central planar portion and a plurality of planar petal-like portions extending outwardly from and in the plane of the central portion; and a material in which the core is embedded, said core including means for attaching said security retaining member to an article to be secured and said material including a material which can be adhesively attached to a surface.

2. A security retaining member according to claim 1 wherein said means for attaching said security retaining member to an article to be secured comprises a threaded bore centrally located within said central portion.

3. A security retaining member according to claim 1 wherein each of said petal-like portions comprises a hole through which the material in which the core is embedded is permitted to flow during the fabrication of the retaining member for enhancing the adherence of the material to the core.

4. A security retaining member according to claim 1 wherein the major dimension of the core is approximately 1.70 inches, the center of the holes in the petal-like portions lie on a circle approximately 1.25 inches in diameter and the core is approximately 0.12 inches thick.

5. A security retaining member according to claim 1 wherein said core comprises a metallic material.

6. A security retaining member according to claim 5 wherein said metallic material comprises diecast zinc.

7. A security retaining member according to claim 1 wherein said material comprises neoprene.

8. A security retaining member according to claim 7 wherein said neoprene comprises 60 durometer neoprene.

9. A security retaining member according to claim 1 wherein said petal-like portions comprise four petal-like portions having a centerline 90 degrees apart.

10. A method of making a security retaining member comprising the steps of:

forming a core having a central planar portion and a plurality of petal-like planar portions extending outwardly from and in the plane of the central portion, said step of forming said core including the step of providing a means for attaching said core to an article to be secured; and embedding said core in a material which can be adhesively attached to another article.

11. A method according to claim 10 wherein said step of providing a means for attaching said core to an article to be secured comprises the step of providing a threaded bore centrally located within said central portion.

12. A method according to claim 10 wherein said step of forming said core comprises the step of providing a hole in each of said petal-like portions for receiving said material.

13. A method according to claim 10 wherein said step of embedding said core comprises the step of embedding said core in neoprene.

14. A security retaining member comprising:

a core having a central portion and a plurality of petal-like portions extending outwardly from the central portion; and a material in which the core is embedded, wherein each of said petal-like portions comprises a hole through which the material in which the core is embedded is permitted to flow during the fabrication of the retaining member for enhancing the adherence of the material to the core, said core including means for attaching said security retaining member to an article to be secured and said material including a material which can be adhesively attached to a surface.

15. A method of making a security retaining member comprising the steps of:

forming a core having a central portion and a plurality of petal-like portions extending outwardly from the central portion, said step of forming a core including the step of providing a means for attaching said core to an article to be secured; and embedding said core in a material which can be adhesively attached to a surface, wherein said step of forming said core comprises the step of providing a hole in each of said petal-like portions for receiving said material.

* * * * *